(12) United States Patent
Schuster et al.

(10) Patent No.: US 8,783,069 B2
(45) Date of Patent: Jul. 22, 2014

(54) PROCESS FOR PRODUCING A QUARTZ GLASS CYLINDER AND ALSO SUPPORT FOR CARRYING OUT THE PROCESS

(75) Inventors: Anke Schuster, Halle (DE); Rene Sowa, Pouch (DE); Martin Trommer, Bitterfield-Wolfen (DE); Udo Peper, Halle/Saale (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 188 days.

(21) Appl. No.: 13/508,783

(22) PCT Filed: Sep. 14, 2010

(86) PCT No.: PCT/EP2010/063438
§ 371 (c)(1),
(2), (4) Date: May 22, 2012

(87) PCT Pub. No.: WO2011/054574
PCT Pub. Date: May 12, 2011

(65) Prior Publication Data
US 2012/0231271 A1    Sep. 13, 2012

(30) Foreign Application Priority Data

Nov. 9, 2009  (DE) .......................... 10 2009 052 308

(51) Int. Cl.
*C03B 37/018* (2006.01)
(52) U.S. Cl.
USPC .................... 65/421; 65/413; 65/531; 428/67
(58) Field of Classification Search
CPC ............. C03B 37/14; C03B 37/01406; C03B 37/01413; C03B 37/0142; C03B 37/01433; C03B 37/0144; C03B 37/01446; C03B 37/01453; C03B 37/01466; C03B 37/01473; C03B 37/0148; C03B 37/01486; C03B 37/01493

USPC .................... 65/413, 421, 422, 531
See application file for complete search history.

(56) References Cited

U.S. PATENT DOCUMENTS 3,806,570 A *  4/1974  Flamenbaum et al. ...... 264/1.21
4,233,052 A    11/1980  Dominick et al.
(Continued)

FOREIGN PATENT DOCUMENTS

DE       2313249         10/1973
JP       56014434 A  *   2/1981
(Continued)

OTHER PUBLICATIONS

English Translation of JP56014434A translated by McElroy Translation Company, Jan. 2014.*
(Continued)

*Primary Examiner* — Matthew Daniels
*Assistant Examiner* — Lisa Herring
(74) *Attorney, Agent, or Firm* — Tiajoloff and Kelly LLP

(57) ABSTRACT

In a known process for producing a quartz glass cylinder, a porous soot tube, which is sintered to form the quartz glass cylinder, is produced by depositing $SiO_2$ particles on an outer cylindrical surface of a support, which rotates about the longitudinal axis thereof and has a layer of silicon carbide (SiC layer). In order on this basis to specify a support having a high resistance to fracture, which firstly can easily be removed and which secondly presents a low risk of contamination for the soot body, the invention proposes that the SiC layer is treated at a high temperature in an oxygen-containing atmosphere before the $SiO_2$ particles are deposited, in such a manner that an $SiO_2$ protective layer having a thickness of at least 0.1 μm is produced by oxidation.

7 Claims, 1 Drawing Sheet

(56) References Cited

U.S. PATENT DOCUMENTS

Figure 1:
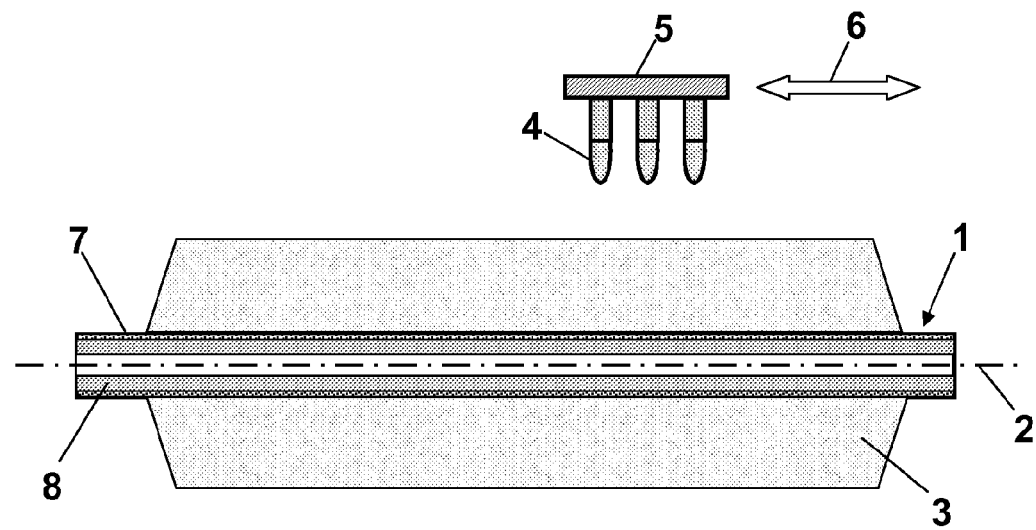

| | | | |
|---|---|---|---|
| 4,289,517 A * | 9/1981 | Bailey et al. | 65/422 |
| 4,904,515 A * | 2/1990 | Matsuo et al. | 428/67 |
| 4,987,016 A * | 1/1991 | Ohto et al. | 428/34.1 |
| 5,769,921 A * | 6/1998 | Yokokawa | 65/412 |
| 2007/0214834 A1 | 9/2007 | Roeper et al. | |
| 2010/0163083 A1* | 7/2010 | Suzuki et al. | 134/184 |

FOREIGN PATENT DOCUMENTS

| | | | |
|---|---|---|---|
| JP | 56078117 A * | 6/1981 | |
| JP | 61-168544 | 7/1986 | |
| JP | 04209726 A * | 7/1992 | |
| WO | 2005097693 A1 | 10/2005 | |
| WO | 2008038298 A2 | 4/2008 | |

OTHER PUBLICATIONS

English Translation of JP04209726A translated by FLS, Inc., Jan. 2014.*

English Translation of JP56078117A translated by Phoenix Translations, Jan. 2014.*

Patent Abstracts of Japan. English translation of JP 61-168544., Jul. 30, 1986.

* cited by examiner

PROCESS FOR PRODUCING A QUARTZ GLASS CYLINDER AND ALSO SUPPORT FOR CARRYING OUT THE PROCESS

The present invention relates to a method for producing a quartz glass cylinder in that a porous soot tube is produced by depositing $SiO_2$ particles on a cylinder jacket surface of a support which is rotating about its longitudinal axis and comprises a layer of silicon carbide (SiC layer), and in that the soot tube is sintered so as to form the quartz glass cylinder.

Furthermore, the present invention relates to a support which is suited for performing the method and which comprises a layer of silicon carbide (SiC layer).

PRIOR ART

In the manufacture of a tubular $SiO_2$ soot body according to the "OVD (outside vapor deposition)" method, a silicon-containing start compound is converted by flame hydrolysis or pyrolysis into fine $SiO_2$ particles that are deposited on a cylinder jacket surface of a support rotating about its longitudinal axis.

The tubular soot body obtained thereby (hereinafter also called "soot tube") normally contains a multitude of hydroxyl groups and is subjected to a dehydration treatment prior to sintering. Due to the sintering of the soot tube, one obtains a hollow cylinder of quartz glass or, in the event that the inner bore of the soot tube collapses during sintering, a solid cylinder of quartz glass.

Hollow and solid cylinders of synthetic quartz glass serve as intermediate products for a multitude of components for the optical and chemical industry, particularly for the manufacture of lenses for projection and exposure systems in microlithography and for preforms for optical fibers.

An OVD method for producing a quartz glass cylinder and a support of the aforementioned type are known from DE 23 13 249 B2. The publication suggests for the production of a tube made of quartz glass with a low hydroxyl-group content that a $SiO_2$ tube should be produced by depositing $SiO_2$ particles on a support of $Al_2O_3$, mullite, boron nitride, SiC, glass, or class ceramic, and that said tube should subsequently be vitrified on the support in an inert gas atmosphere by zone sintering.

A special difficulty arises when the support is removed from the inner bore before or after the sintering of the soot tube. The removal of a fixed support may cause injuries of the inner wall of the soot tube, or the support has to be removed by drilling out. At any rate a complicated treatment of the inner bore is needed.

To facilitate the removal of the support, different measures are known. For instance, the use of a conical support, the use of a support of graphite, a pre-coating of an $Al_2O_3$ support with graphite powder (U.S. Pat. No. 4,233,052 A), or the pre-coating of a support of glass or of SiC with BN powder (JP 61168544 A (1985)) is suggested.

These measures, however, are accompanied by other drawbacks. The use of graphite leads to changed redox conditions in the reactor and to a melting loss under oxidizing conditions. A BN coating on a support may, just like the use of support materials other than quartz glass, leave impurities in the quartz glass blank, said impurities passing into the $SiO_2$ soot layer by diffusion, abrasion or corrosion. Support tubes of $Al_2O_3$ show a relative low resistance to fracture.

The use of supports of quartz glass could prevent contamination of the soot body. However, in a way similar to supports of $Al_2O_3$, quartz glass supports do not exhibit resistance to fracture as is particularly needed for producing large soot bodies with a relatively small inner diameter. Moreover, in quartz glass supports the above-discussed problem arises that it is relatively difficult to remove them because of a missing expansion difference between soot body material and support material.

Technical Objective

It is the object of the present invention to provide a method for producing a quartz glass cylinder according to the OVD method by using a support showing high resistance to fracture, which on the one hand can be removed easily and on the other hand hardly poses any risk of contamination to the soot body.

It is also the object of the present invention to provide a support particularly suited for performing the method, which is distinguished by high mechanical stability and which also permits the manufacture of large-volume and thick-walled soot bodies with a small inner bore.

As for the method, this object starting from a method of the aforementioned type is achieved according to the invention in that the SiC layer is treated prior to deposition of the $SiO_2$ particles at a high temperature in an oxygen-containing atmosphere such that a $SiO_2$ barrier layer with a thickness of at least 0.1 µm is produced by oxidation.

In the modification according to the invention of the method of the generic type the soot tube is produced on a support which consists of SiC completely or at least in the region of its surface facing the soot tube. The surface of this SiC layer is converted by oxidation into $SiO_2$ prior to the beginning of the deposition process, whereby a thin barrier layer of $SiO_2$ with a thickness of at least 0.1 µm is obtained. Ideally, the $SiO_2$ barrier layer is closed and completely covers the SiC surface.

The method according to the invention is a multistage method insofar as the surface of the SiC layer is first converted in an oxygen-containing atmosphere at a high temperature into a $SiO_2$ barrier layer and it is only thereafter that a contact is established with the deposited $SiO_2$ particles.

Hence, in the method according to the invention the $SiO_2$ soot deposition is carried out on a $SiO_2$ barrier layer which consists of congeneric material with respect to the $SiO_2$ soot material and which prevents or reduces the input of impurities into the soot body during the deposition process.

The $SiO_2$ barrier layer also deploys a protective action with respect to abrasion and corrosion of the SiC support material by the furnace atmosphere, wherein it is particularly advantageous that the material removed by abrasion or corrosion is also congeneric with respect to the $SiO_2$ soot body and thus reduces the risk of contamination.

However, a pure $SiO_2$ barrier layer of a thickness of only a few atom layers on the SiC layer meets neither the demand made on an efficient diffusion barrier relative to impurities issuing from the SiC of the support nor the demands made on the protective action with respect to abrasion and corrosion of the SiC support material. The minimum thickness of the $SiO_2$ barrier layer is therefore 0.1 µm Apart from the $SiO_2$ barrier layer, the support consists completely or at least in part of SiC. This material is thermally and mechanically stable and is also suited in the case of small wall thicknesses for holding a heavy large-volume soot body.

After cooling of the soot body the support is removed. As a rule, the thin $SiO_2$ barrier layer remains completely on the support and does not aggravate the removal of the support as compared with a support having a pure SiC layer.

A quartz glass cylinder in the form of a tube or rod is obtained by sintering the soot body. Optionally, a dehydration treatment is carried out in a halogen-containing, particularly in a fluorine- or chlorine-containing, atmosphere prior to the sintering of the soot body.

As for the technical production of SiC, a multitude of methods are known that result in different modifications and purities of the SiC. It has turned out to be particularly useful for the application as a support in an OVD method according to the invention when the SiC layer consists of a silicon infiltrated silicon carbide (SiSiC).

This is a so-called "reaction-bound silicon infiltrated SiC". This material is virtually without pores, which facilitates the removal of the support, and it contains metallic silicon that is oxidizable into $SiO_2$ relatively easily, as compared with SiC and at least on the surface. This facilitates the manufacture of a $SiO_2$ barrier layer which is as uniform and closed as possible, with an oxidation period that is comparatively short.

The $SiO_2$ barrier layer is preferably produced in that the treatment of the support in oxygen-containing atmosphere comprises annealing in a furnace or heating the support by means of an oxygen- or hydrogen-containing burner flame at a temperature of at least 1000° C., preferably at a temperature of at least 1200° C.

At a temperature lower than 1000° C. the conversion of SiC into a $SiO_2$ barrier layer having a thickness of at least 0.1 µm requires an uneconomically long period of time. On the other hand, treatment temperatures of more than about 1440° C. are not preferred particularly in the case of SiC layers consisting of SiSiC because the metallic silicon is melting in this process.

It has turned out to be useful when a $SiO_2$ barrier layer is produced with a thickness in the range of 1 µm to 10 µm.

A relatively thin barrier layer meets the demands made on protection against contamination and abrasion and it permits a multiple use of the support because of the low corrosive wear of the SiC layer without the surface quality deteriorating to a substantial degree. The production of layer thicknesses of more than 10 µm requires very long treatment periods because the resulting $SiO_2$ also acts as a barrier layer with respect to further oxidation. These long treatment periods are not justified by a significant plus with respect to the efficiency of the $SiO_2$ barrier layer. Moreover, the removability of the support is aggravated by thick $SiO_2$ barrier layers.

A procedure is preferred wherein a cristobalite-containing $SiO_2$ barrier layer is produced.

Barrier layers which consist completely or predominantly of cristobalite exhibit a high mechanical and thermal resistance. Moreover, they counteract a fusion bond with the soot body, thereby contributing to an easier removal of the support. Due to the high treatment temperature and/or long treatment periods needed for producing the $SiO_2$ barrier layer and due to customary alkali or alkaline-earth impurities on the surface of the SiC layer, barrier layers are normally formed that consist completely or predominantly of cristobalite if no special precautions are taken for cleaning the support.

Also in the case of rather thick barrier layers predominantly consisting of cristobalite the layer regions next to the SiC surface are crystalline as a rule and are more and more penetrated by nests of amorphous $SiO_2$ towards the free surface, so that the corresponding $SiO_2$ phases penetrate one another.

A $SiO_2$ barrier layer turns out to be particularly stable if it comprises layer portions of amorphous $SiO_2$.

Ideally, the layer portions of amorphous $SiO_2$ form a closed layer that is distinguished by tightness relative to gases and prevents excessive corrosion processes on the support which may take place particularly due to reactive gases such as $H_2O$ and HCl; at the same time it reduces the in-diffusion of impurities from the interior of the support into the soot body, and it minimizes the risk of an input of impurities by abrasion.

As for the support, the aforementioned object starting from a support of the aforementioned type is achieved according to the invention in that the SiC layer is provided with a $SiO_2$ barrier layer which is produced by oxidation and has a thickness of at least 0.1 µm.

The support consists completely or at least in the portion of its outer cylinder jacket surface of SiC. In the modification according to the invention of the generic SiC support the SiC surface is coated with a barrier layer of $SiO_2$ with a thickness of at least 0.1 µm that is ideally closed and completely covers the SiC surface.

Hence, the support comprises a cylinder jacket surface which is congeneric with respect to the $SiO_2$ soot tube to be deposited thereon, and which prevents or reduces the input of impurities into the soot tube.

Moreover, the $SiO_2$ barrier layer deploys a protective action with respect to abrasion and corrosion of the SiC support material by the furnace atmosphere and the deposited soot layer. It is particularly advantageous here that also wear produced by abrasion or corrosion consists of congeneric material with respect to the $SiO_2$ soot body and thereby reduces the contamination risk thereof.

SiC is thermally and mechanically stable and is suited also in the case of small wall thicknesses for holding a heavy large-volume soot body. Moreover, high resistance to fracture and high thermal shock resistance contribute to operational reliability. The SiC layer is configured as a rod, tube or coating of a rod or tube. Rod or tube consists of one part or they are composed of several segments or sub-pieces.

The $SiO_2$ barrier layer is preferably produced by a treatment of the support in oxygen-containing atmosphere which comprises either annealing in a furnace or heating the support by means of an oxygen- or hydrogen-containing burner flame at a temperature of at least 1000° C., preferably at a temperature of at least 1200° C., as has been explained in more detail above with reference to the method according to the invention.

Advantageous configurations of the support according to the invention become apparent from the sub-claims. Insofar as configurations of the support indicated in the sub-claims copy the procedures indicated in sub-claims with respect to the method of the invention, reference is made as a supplementary explanation to the above observations on the corresponding method claims.

EMBODIMENT

The invention will now be explained in more detail with reference to an embodiment and a drawing. The drawing schematically shows in FIG. 1 a device for producing a $SiO_2$ soot body while performing the method according to the invention; and FIG. 2 a support according to the invention in a radial sectional illustration.

The device shown in FIG. 1 serves to produce a $SiO_2$ soot body 3. The device shows a support tube 1 of reaction-bound silicon infiltrated silicon carbide (SiSiC) which rotates about is longitudinal axis 2. With the help of the OVD method successive $SiO_2$ soot layers are deposited on the cylinder jacket surface of the support tube 1, whereby the porous soot body 3 is formed. Deposition burners 4 of quartz glass are provided for producing the soot layers, the deposition burners 4 being mounted at a distance of 150 mm each on a joint slide 5 which is reversingly movable along the support tube 1 between the ends of the forming soot body 3, as illustrated by the directional arrow 6, and which is displaceable in a direction perpendicular thereto. The soot body deposition process will be terminated as soon as the soot body 3 has an outer diameter of about 350 mm.

The SiC support tube 1 has an outer diameter of 43 mm and an inner diameter of 26 mm. Before the beginning of the deposition process it is subjected to a treatment for producing a $SiO_2$ barrier layer 7. To this end the SiC support tube 1 is introduced into a furnace and treated in air at a temperature of 1200° C. for a period of 12 h. In this process a closed $SiO_2$ layer is formed on all surfaces of the SiC support tube 1, the closed $SiO_2$ layer being present in the area of the SiC surface in a predominantly crystalline form as cristobalite. The SiC support tube 1 treated in this way thus consists of a base body 8 of SiC that is coated on all sides with a $SiO_2$ barrier layer having a thickness of about 2 μm. Especially the $SiO_2$ barrier layer 7 on the outer cylinder jacket surface, which is shown in FIG. 1, is here important for the method according to the invention.

Figure 2:
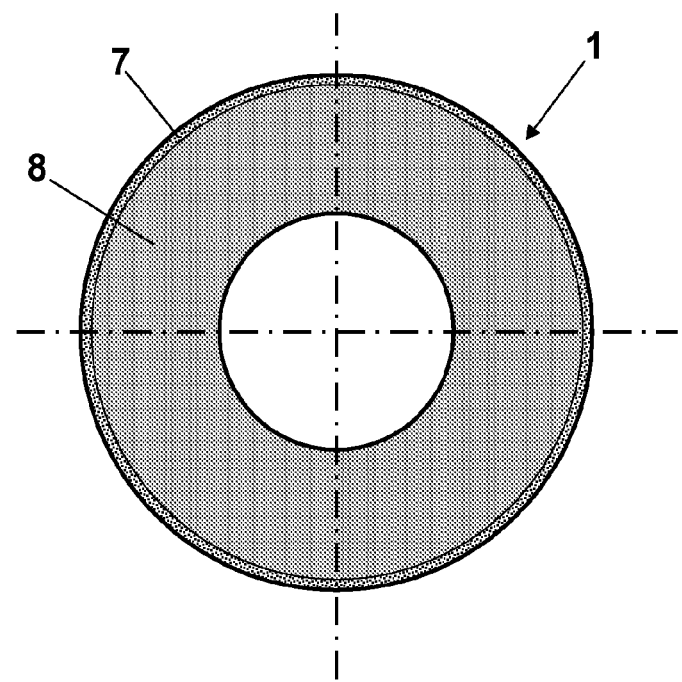

As can be seen from the sectional illustration of the support tube 1 according to FIG. 2, the $SiO_2$ barrier layer 7 encloses the base body 8. The base body 8 consists of SiSiC. The $SiO_2$ barrier layer 7 prevents the input of impurities issuing from the base body 8, and it simultaneously shields the body against the ambient atmosphere and against abrasive attack.

The illustrations in FIGS. 1 and 2 are not true to scale; especially the thickness of the $SiO_2$ barrier layer 7 is plotted in a particularly exaggerated way for the sake of a clear illustration.

The method according to the invention shall now be described with reference to the arrangement shown in FIG. 1:

For the production of the $SiO_2$ soot body 3 according to the method of the invention the deposition burners 4 are each fed with oxygen and hydrogen as burner gases and also with a gas stream containing $SiCl_4$ as feedstock material for the formation of the $SiO_2$ particles. These components are converted in the respective burner flame into $SiO_2$ particles and these are deposited layer by layer on the support tube 1 so as to form the porous $SiO_2$ soot body 3. The slide 5 with the deposition burners 4 is here reciprocated with a translation velocity of 800 mm/min along the evolving soot body 3 between the ends thereof.

After completion of the deposition process the support tube 1 is removed. It becomes apparent that the inner surface of the resulting tube of porous $SiO_2$ soot (soot tube) is flat and clean so that a mechanical further treatment is not needed. The surface of the support tube 1 does also not show any visually discernible corrosion. A purity check of the contact surface between soot tube and support tube 1 revealed much smaller impurity contents than in the case of a contact surface with a SiC support tube without $SiO_2$ barrier layer.

The soot tube is subsequently dried in the known manner by hot chlorination in that it is introduced into a dehydration furnace and treated therein at a temperature of around 900° C. in a chlorine-containing atmosphere for a period of 8 h.

The dried soot tube is then introduced into a vacuum type vitrification furnace with vertically oriented longitudinal axis and, starting with its lower end, is continuously supplied at a feed rate of 10 mm/min from the top to an annular heating element and heated zone by zone. The temperature of the heating element is preset to 1400° C. During sintering a melt front is traveling within the soot tube from the outside to the inside and simultaneously from the top to the bottom. The internal pressure within the vitrification furnace is held by continuous evacuation at 0.1 mbar during sintering. A large-volume quartz glass tube (external diameter: 1500 mm) is thereby obtained with a small internal diameter of 43 mm, which tube is distinguished by a high purity that permits a use in the near-core region of a preform for optical fibers—for instance as a substrate tube for inside deposition by means of MCVD methods. The quartz glass tube is e.g. suited for overcladding a core rod during fiber drawing or for making a preform.

The invention claimed is:

1. A method for producing a quartz glass cylinder, said method comprising
   producing a porous soot tube by depositing $SiO_2$ particles on a cylinder jacket surface of a support rotating about a longitudinal axis thereof and having a SiC layer, and
   sintering the soot tube so as to form the quartz glass cylinder, and
   treating the SiC layer prior to deposition of the $SiO_2$ particles at a high temperature in an oxygen-containing atmosphere such that a $SiO_2$ barrier layer with a thickness of at least 0.1 μm is produced by oxidation.

2. The method according to claim 1, wherein the SiC layer consists essentially of a silicon infiltrated silicon carbide (SiSiC).

3. The method according to claim 1, wherein the treatment in oxygen-containing atmosphere comprises annealing the support in a furnace or heating the support using an oxygen- or hydrogen-containing burner flame at a temperature of at least 1000° C.

4. The method according to claim 1, wherein the $SiO_2$ barrier layer is produced with a thickness in the range of 1 μm to 10 μm.

5. The method according to claim 1, wherein the $SiO_2$ barrier layer contains cristobalite.

6. The method according to claim 5, wherein the $SiO_2$ barrier layer comprises layer portions of amorphous $SiO_2$.

7. The method according to claim 1, wherein the treatment in oxygen-containing atmosphere comprises annealing the support in a furnace or heating the support using an oxygen- or hydrogen-containing burner flame at a temperature of at least 1200° C.

* * * * *